United States Patent [19]

Uesugi

[11] Patent Number: 4,807,103
[45] Date of Patent: Feb. 21, 1989

[54] APPARATUS FOR CONTROLLING A PWM CONTROLLED INVERTER

[75] Inventor: Michika Uesugi, Fuji, Japan

[73] Assignee: Kabushiki Kaisha Toshiba, Kawasaki, Japan

[21] Appl. No.: 161,191

[22] Filed: Feb. 26, 1988

[30] Foreign Application Priority Data

May 26, 1987 [JP] Japan .................. 62-128825

[51] Int. Cl.[4] ....................... H02M 7/5387
[52] U.S. Cl. ...................... 363/41; 318/811
[58] Field of Search ............ 363/41.42; 318/803, 318/811

[56] References Cited

U.S. PATENT DOCUMENTS

| 4,099,109 | 7/1978 | Abbondanti | 363/41 |
| 4,410,937 | 10/1983 | Uesugi | 363/132 |
| 4,513,362 | 4/1985 | Aizawa | 363/41 |
| 4,698,744 | 10/1987 | Itani et al. | 318/811 |
| 4,727,468 | 2/1988 | Maekana | 363/41 |

FOREIGN PATENT DOCUMENTS

| 55775 | 4/1982 | Japan | 363/41 |
| 202877 | 12/1982 | Japan | 363/41 |
| 202875 | 12/1982 | Japan | 363/41 |
| 119775 | 7/1983 | Japan | 363/41 |
| 60-200773 | 10/1985 | Japan | |

Primary Examiner—William H. Beha, Jr.
Attorney, Agent, or Firm—Schwartz, Jeffery, Schwaab, Mack, Blumenthal & Evans Foley & Lardner

[57] ABSTRACT

An apparatus for controlling a PWM controlled inverter adapted to effect the waveform control of the inverter output voltage in accordance with the memory content of ROM in which instantaneous output voltage data are memorized. This control apparatus comprises a ROM in which the instantaneous output voltage outputs thereof in the PWM control are memorized, and in which the number of addresses within a predetermined electrical angle section is set to a fixed value irrespective of the number of switching times within the electrical angle section, an electrical angle counter in which duration corresponding to the duration time data read from the ROM is set, an address counter responding to the count-up of the electrical angle counter to advance the read address of the ROM, and a controller for controlling the output voltage of the inverter in accordance with an instantaneous output voltage corresponding to the instantaneous output voltage data read from the ROM.

3 Claims, 1 Drawing Sheet

APPARATUS FOR CONTROLLING A PWM CONTROLLED INVERTER

BACKGROUND OF THE INVENTION

1. Field of the Art

This invention relates to an apparatus for controlling a PWM controlled inverter which effects waveform control of the inverter output voltage in accordance with the memory contents of ROM in which instantaneous output voltage data are memorized.

2. Prior Art

For instance, in order to adjustably operate a compressor in a refrigerating cycle of an air conditioner, it is well known to carry out the adjustable speed operation of a motor for driving such a compressor through an inverter. One method of adjustably operating a motor is to use an a.c. motor as a motor to drive the a.c. motor using a PWM controlled inverter of variable frequency and variable voltage.

In a known control apparatus for controlling inverters of this kind (e.g., see U.S. Pat. No. 4,356,544), control data for PWM (Pulse Width Modulation) control every respective frequencies are memorized or stored in a ROM (Read Only Memory) to read the content of the ROM in accordance with the frequency set data to deliver a control current based therein to respective components, e.g., transistors of the inverter through a waveform shaping circuit and a base drive circuit, thus allowing them to output a predetermined a.c. voltage, e.g., a three-phase a.c. voltage.

In the case of the three-phase inverter, control data of three-phases in a section of an electrical angle of 0 to 30 degrees with an arbitrary phase being as a reference, e.g., control data in a section of 0 to 30 degrees of R-phase, in a section of $-120$ to $-90$ degrees of S-phase, and in a section of 120 to 150 degrees of T-phase with the R-phase being as a reference are memorized in a ROM along with the frequency data. The control data read from the ROM are converted to PWM control waveform corresponding to a section ranging over an electrical angle of 360 degrees by the waveform shaping circuit by making use of symmetry of waveforms in respective sections of 30 degrees. Thus, the required memory capacity of the ROM can be reduced without lowering the output waveform accuracy.

However, the control apparatus of this system still has the following inconvenience. Namely, in the PWM control system, according as the pulse generation electrical angle is finely divided, data of the same turn-on pattern occur over a plurality of electrical angle addresses, with the result that a wastefullness such that the memory data are the same, but that only addresses are different occurs, leading to the decreased utilization factor of the ROM.

SUMMARY OF THE INVENTION

Therefore, an object of this invention is to provide an apparatus for controlling a PWM controlled inverter which improves a utilization factor of ROM, thereby making it possible to perform a desired control with ROM of smaller memory capacity.

To achieve this object, an inverter control apparatus according to this invention comprises a ROM in which instantaneous output voltage and duration data every respective voltage outputs thereof in the PWM control are memorized, and in which the number of addresses within a section of a predetermined electrical angle is set to a fixed value irrespective of the number of switching times within the section of the electrical angle, an electrical angle counter in which duration corresponding to the duration data read from the ROM is set, an address counter responding to the count-up of the electrical angle counter to advance the read address of the ROM, and means for controlling the output voltage of the inverter in accordance with an instantaneous output voltage corresponding to the instantaneous output voltage data read from the ROM.

By memorizing the control data and the duration thereof into ROM in this way, the necessity of writing the same data over a plurality of addresses is eliminated, thereby making it possible to perform a desired control by using a ROM of which memory capacity is reduced accordingly without lowering the output waveform accuracy. In addition, by making a setting such that the number of ROM data within a section of a predetermined electrical angle is fixed irrespective of the switching frequency, the switching of read address of the ROM can be carried out only using a counter. Thus, information indicative of the final data becomes unnecessary, the means for discriminating it also becomes unnecessary, and the number of bits per one word of the ROM can be reduced.

DETAILED DESCRIPTION OF PREFERRED EMBODIMENT

Figure 1:
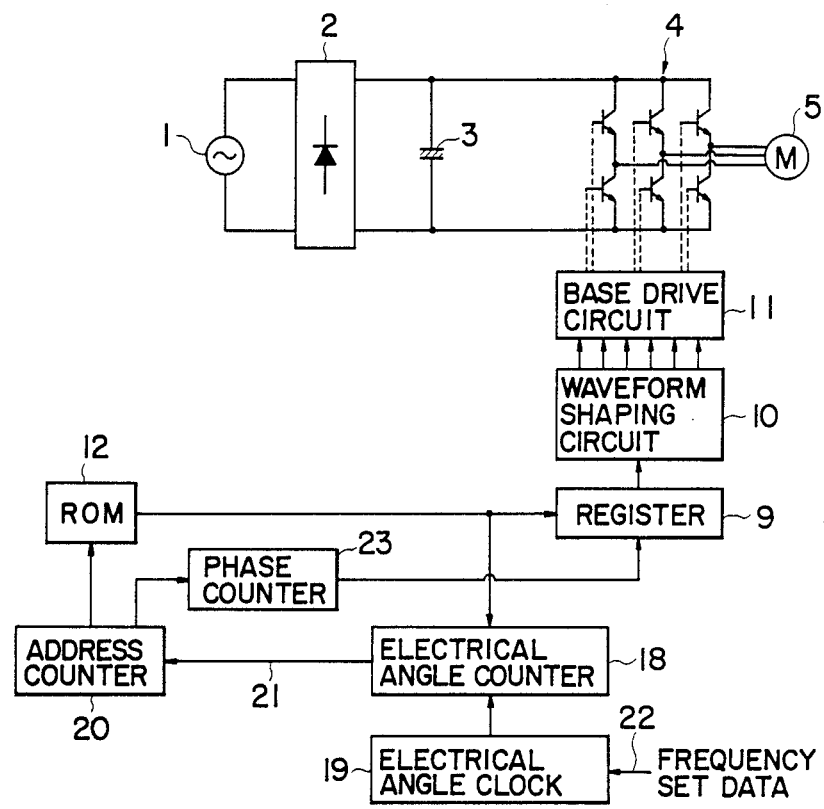
FIG. 1 is a block diagram showing an apparatus for controlling a PWM controlled inverter according to this invention.

In the main circuit of the apparatus in FIG. 1, a d.c. power is obtained from a commercial a.c. power source 1 through a rectifier 2 and a smoothing capacitor 3. The d.c. power thus obtained is converted to an a.c. power of variable frequency and variable voltage by an inverter 4. The a.c. power is delivered to a motor 5.

Figure 2:
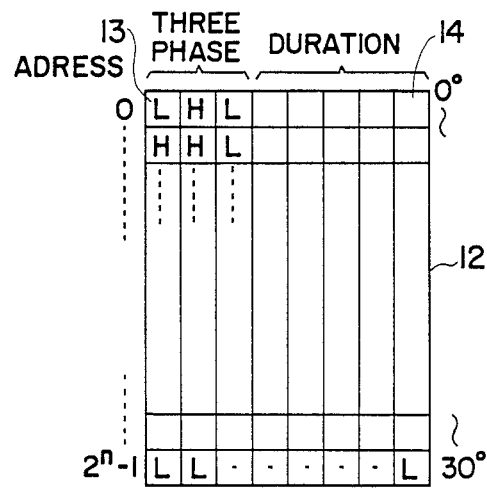
FIG. 2 shows the contents of the ROM in FIG. 1.

In the control apparatus for controlling the inverter 4, control data for PWM control every respective frequencies are memorized in advance into a ROM 12. Instantaneous output voltage data 13 of three-phase a.c. and the duration data 14 thereof are written into addresses 0 to $2^n-1$ of the ROM 12 as shown in FIG. 2.

The number of data written into the ROM 12 is set to the same value as the value ($2^n-1$) of the full count of an address counter 20. The same instantaneous output voltage data are written into two addresses or more, to thereby make an adjustment such that the nubmer of data is equal to $2^n-1$. For the instantaneous output voltage data 13 written into the addresses 0 to $2^n-1$, data of 0 to 30 degrees may be used as previously described. The number of bits of the duration data 14 is determined by the minimum pulse width of the PWM control waveform and the actual pulse width is set by the duration data 14 in respective addresses. The instantaneous output voltage data 13 from the ROM 12 is output to a register 9 and the duration data 14 therefrom is output to an electrical angle counter 18.

When the electrical angle counter 18 receives the duration data 14 in respective addresses, it sets each time of duration. The time thus set is down-counted by a clock pulse input from an electrical angle clock 19.

When the set time becomes equal to zero, a count signal 21 is output to an address counter 20.

The address counter 20 serves to set the read address of the ROM 12. This counter counts up from zero every time the count signal 21 is input from the electrical angle counter 18 to load new ROM data into the electrical angle counter 18 every time. When the content of the address counter 20 becomes equal to $2^n - 1$ and the electrical angle counter 18 has completed a count operation corresponding to the electrical angle of 30 degrees to count up, a flip-flop (not shown) connected to the MSB of the address counter 20 is inverted. Thus, the counting direction of the up/down count of the address counter 20 is reversed. As a result, the address counter 20 repeats the electrical angle count and the address count in a reverse direction from $2^n - 1$ to zero.

Such a repetitive operation of the counter 20 may be readily realized by implementing signal inverting processing using a signal indicative of the content of the up-count, e.g., a "1" signal of the MSB, in the case of a binary counter, thus to convert the count output of the up-count to the down count output.

The instantaneous output voltage data 13 thus obtained are edited by a register 9 controlled by a phase counter 23. Thus, control pulses for three-phase PWM control are obtained.

The clock is changed by the frequency set data from the electrical angle clock 19 to control the down count time of the electrical angle counter 18 to change the reading rate or speed of the ROM 12, thus adjusting the inverter output frequency to a frequency set data 22. In that case, when there is employed a scheme to memorize the instantaneous output voltage data 13 and the duration data 14 into the ROM 12 to input the frequency set data to the ROM 12, such a clock to output clock pulses of a fixed repetition frequency may be used for the electrical angle clock 19.

In the control apparatus thus constituted, when an address "0" of the ROM 12 is output by the address counter 20, the instantaneous output voltage data 13 at the address "0" is output to the register 9 and the duration data 14 is set at the electrical angle counter 18. After such a setting, the electrical angle clock 19 allows the electrical angle counter 18 to down-count at a speed corresponding to the frequency set data 22. Thus, when the count value becomes equal to zero, a count signal 21 is output to the address counter 20. Responding to this the address counter 20 initiates count operation to set the address of the ROM 12 at "1". In addition, the instantaneous output voltage data 13 and the duration data 14 at that address "1" are output to the register 9 and the electrical angle counter 18, respectively. At times subsequent thereto, addresses are changed in succession. Thus, the instantaneous output voltage data 13 and the duration data 14 of the ROM 12 at corresponding addresses are read. When the address final stage is reached, as described above, the flip-flop connected to the address counter 20 is inverted. Thus, the count mode of up/down of the address counter 20 is reversed, so that the electrical angle count and the data count are repeatedly carried out in an opposite direction from $2^n - 1$ to zero.

When the output frequency of the inverter 4 is changed, it is sufficient to change the sum total of the duration data. For example, when the sum total of the duration data in a section of the electrical angle of 30 degrees is represented by N, the output frequency is expressed as K/(12·N) where K is a constant. While K is ordinarily changed in order to alter the output frequency, it is needless to say that such an alternation may be made by changing N.

In accordance with the configuration stated above, since the number of data is fixed ($2^n$), means for checking the number of data and the content of the ROM data becomes unnecessary. In addition, since data of long duration can be memorized with it being divided into a plurality of addresses of the ROM, it is possible to save the capacity of the ROM.

As stated above, in accordance with this invention, since the address of the ROM is counted to the maximum count value at all times, there is no necessity of adding a special information for discriminating a concerned data to be the final data to the memory data. Thus, the MSB of the address counter having the number of addresses of $2^n$ can be utilized as the final address at all times. In addition, by memorizing data of long duration preferentially with it being divided into a plurality of addresses, the memory capacity required for memorizing duration can be reduced. Thus, this invention can provide an inverter control apparatus having an excellent utilization factor which is small in the number of bits per each word data stored in ROM.

What is claimed is:

1. An apparatus for controlling a pulse width modulation (PWM) controlled inverter comprising:

a read only memory (ROM) in which instantaneous output voltage data and duration data every respective voltage outputs thereof in the PWM control are memorized, and in which the number of addresses within a section of a predetermined electrical angle is set to a fixed value irrespective of the number of switching times within said section of the electrical angle;

an electrical angle counter in which duration corresponding to the duration data read from said ROM is set;

an address counter responding to the count-up of said electrical angle counter to advance the read address of said ROM; and means for controlling an output voltage of the inverter in accordance with an instantaneous output voltage corresponding to the instantaneous output voltage data read from said ROM.

2. An apparatus for controlling a PWM controlled inverter as set forth in claim 1, wherein said address counter is comprised of a binary up/down counter, the counting direction thereof being reversed in accordance with the content of the most significant bit.

3. An apparatus for controlling a PWM controlled inverter as set forth in claim 1, which further comprises means for changing the sum total of times of duration in order to vary a frequency of the inverter output voltage.

* * * * *